United States Patent [19]

Crocker

[11] Patent Number: 5,191,157

[45] Date of Patent: Mar. 2, 1993

[54] METHOD FOR DISPOSAL OF HAZARDOUS WASTE IN A GEOPRESSURE ZONE

[76] Inventor: Clinton P. Crocker, P.O. Box 4440128, Houston, Tex. 77244

[21] Appl. No.: 680,949

[22] Filed: Apr. 5, 1991

[51] Int. Cl.[5] ............................. G21F 9/34; B09B 1/00
[52] U.S. Cl. ................................... 588/250; 405/128; 405/136
[58] Field of Search ............... 405/128, 129; 252/626, 252/628, 633; 250/506.1, 507.1; 588/250

[56] References Cited

U.S. PATENT DOCUMENTS

| | | | |
|---|---|---|---|
| 3,399,723 | 9/1968 | Stuart | 166/254 |
| 3,986,977 | 10/1976 | Gablin | 252/628 |
| 4,056,362 | 11/1977 | Gablin et al. | 252/628 X |
| 4,167,491 | 9/1979 | Gablin et al. | 252/628 |
| 4,168,243 | 9/1979 | Gablin et al. | 252/628 |
| 4,178,109 | 12/1979 | Krutenat | 405/128 |
| 4,196,169 | 4/1980 | Gablin et al. | 252/628 X |
| 4,252,462 | 2/1981 | Klingle et al. | 405/129 |
| 4,316,814 | 2/1982 | Uerpmann | 405/128 X |
| 4,335,978 | 6/1982 | Mutch | 405/129 |
| 4,337,167 | 6/1982 | Bird et al. | 252/633 |
| 4,377,509 | 3/1983 | Haynes et al. | 252/633 |
| 4,400,314 | 8/1983 | Ellis et al. | 252/633 |
| 5,022,788 | 6/1991 | Baird | 405/128 |

OTHER PUBLICATIONS

"Existence and flow behavior of gas in geopressurized brine zones", C. Matthews, Journal of Petroleum Geology, Dec. 1980, pp. 2114-2222.

"Abnormal Formation Pressures", W. Fertl, Elsevier Scientific publishing Co. New York, pp. 1-4, 14-19, 12, 22.

*Primary Examiner*—Randolph A. Reese
*Assistant Examiner*—John A. Ricci
*Attorney, Agent, or Firm*—Dodge, Bush, Moseley & Riddle

[57] ABSTRACT

A method and apparatus for safely disposing hazardous waste in a borehole extending through a seal for a subsurface geopressured formation wherein sealed elongated containers filled with hazardous waste are lowered in the borehole to be positioned within a geopressured formation where the containers are encased in the borehole. In an alternative embodiment, hazardous waste is disposed in the borehole by pressuring the liquid waste and injecting the waste through perforations in a borehole casing directly into the pores of a geopressured formation. The pressurized liquid fractures the geopressure formation and upon release of the pressure on the waste liquid the waste is trapped in the geopressured formation. The seal of the geopressure formation is then restored for providing safe disposal.

9 Claims, 1 Drawing Sheet

METHOD FOR DISPOSAL OF HAZARDOUS WASTE IN A GEOPRESSURE ZONE

BACKGROUND OF THE INVENTION

1. FIELD OF THE INVENTION

This invention relates to a method and apparatus for permanent disposal of hazardous waste and more particularly, to a method and apparatus for permanent disposal of hazardous waste using a borehole extending through a geopressured formation.

2. CROSS REFERENCE TO RELATED APPLICATION

The disclosure of this application is related to my prior application having the same title, now all abandoned, as follows:

| Ser. No. | Filing Date |
| --- | --- |
| 06/468,842 | June 20, 1983 |
| 06/621,518 | June 18, 1984 |
| 07/018,757 | February 24, 1987 |
| 07 147/040 | January 20, 1988 |

3. DESCRIPTION OF THE PRIOR ART

Permanent disposal of hazardous waste, such as flammables, heavy metals, acids and bases and synthetic organic chemicals present difficult problems. The difficulties are especially acute in disposal of heavy metals (radioactive) waste. Many methods have been developed to provide a proper and safe disposal of hazardous waste without contaminating our natural resources. Various disposal methods include landfills, injection wells, incineration, ocean dumping, wastes exchange, and destruction through organisms ("superbug" method).

U.S. Pat. No. 4,335,978 to Mutch discloses a land fill disposal system. Rather than relying upon the subsurface formation itself to prevent fluid migration, a pair of spaced impermeable liners are employed to prevent fluid migration. The disclosed land fill is located above rather than below the subsurface water table for the area to preclude contamination.

Haynes et al U.S. Pat. No. 4,377,509 is entitled "Packaging for Ocean Disposal of Low-Level Radioactive Waste Material". A plurality of conventional 55 gallon metal drums are filled with the nuclear waste material and placed within a concrete shell. A filler material of asphaltic or a dry portland cement concrete is then used to fill the shell. Immediately prior to dumping in the ocean, water is introduced into the shell to activate the cement. In an alternate embodiment, the concrete is allowed to harden before dumping into the ocean.

U.S. Pat. No. 4,377,167 to Bird et al discloses two improved container materials for solid waste materials at an underground impervious stable rock formation. The prior practice had been to rely upon the insolubility of the radioactive elements to prevent migration of the radioactive waste material rather than containing the waste for a sufficient period of time to effect decay within the container. Bird's invention resides in forming a container out of a naturally occurring nickel alloy having proven superior aging characteristics.

The Upermann U.S. Pat. No. 4,316,814 is entitled "Seal For A Storage Borehole Accommodating Radioactive Waste and Method of Applying the Seal". The storage waste containers are lowered into the borehole formed in a salt formation in a stacked relationship. The seal of the borehole above the stored material prevents escape of the radioactive waste up the borehole.

The Klingle et al U.S. Pat. No. 4,252,462 is entitled "Chemical Land Fill" for disposal of waste water sludge. An impoundment area having a liquid impervious base and a perimeter dike is arranged to receive the waste water liquid therein. The sludge is dewatered and subsequently covered with an impervious layer.

The following patents to Gablin et al disclose systems for disposing of nuclear reactor effluent having mixed liquid and particulate matters: U.S. Pat. Nos. 4,196,169, 4,168,243, 4,056,362, 4,167,491, 3,986,977.

Geologists have characterized subsurface rock formations forming the earth's crust in various ways. One such classification has been to divide sedimentary rocks into two broad groups based on their pore-fluid pressures. These two mutually exclusive groups are labeled (1) hydropressures and (2) geopressures, and will be defined in this application as such. Hydropressure zones or formation have pore fluid pressures that are created by the effective weight of the overlying waters plus the back pressure of out-flowing waters. Geopressure formations or zones are created where the hydropressure rock is sealed in a confined geological container (geopressure cell) and is subjected to a geostatic pressuring source greater than hydropressures. The geostatic pressuring force source is the weight and temperature of the earth's crust with depth of burial. A classic example of a hydropressure-geopressure province is the Gulf of Mexico Salt Basin, which includes the Texas-Louisiana Cenzoic Salt Basin.

Hydropressure formations have leaks which enable flow or migration of the fluid pressure so over time they adjust to the hydropressure pressure for the depth. This is commonly referred to as normal pressure. Unlike hydropressures or hydropressure formations, geopressure formations are sealed. A geopressure seal is defined as a restriction to flow such that geopressures have not been dissipated between the time they were created in the geologic past and the present. By definition all geopressures or geopressure formations must have a geopressure seal. The block of the earth's crust that is sealed off and contains the geopressures is called a geopressure cell which is the definition adopted herein. To create a geopressure cell (a confined or enclosed container or reservoir), the surrounding earth crust formations must be effective as a seal at the top, bottom and all sides of the cell.

The geopressure cells or formations are sealed in regional fault blocks by shale layers and regional fault growths. Porosity is preserved in geopressure formation or zones due to the pore fluid pressure which is greater than the hydropressure for the same depth. They are sometimes called or referred to as abnormally high-pressure zones or formations in the petroleum industry.

For an in depth description of hydropressure geopressure formations and their characteristics and properties, see the article "Geopressures" by Charles A. Stuart which appears in the Supplemental Proceedings of the Second Symposium on Abnormal Subsurface Pressure presented Jan. 30, 1970 at Louisiana State University in Baton Rouge, La.

The encountering of geopressure zones when drilling for hydrocarbons or minerals presented substantial problems. In U.S. Pat. No. 3,399,723, to Charles A. Stuart (class 166 subclass 4) those drilling problems associated with encountering a geopressure formation are addressed, but not for the purpose of the present invention. From the standpoint of describing the present invention both hydropressure and geopressure formations are defined and explained at length in the Stuart patent. The problem of encountering the abnormally high pressure of the geopressure zone when the geopressure barrier seal (the transition or mutation zone) is broken or penetrated by the drill bit is described as a kick and the parameters of accommodating that pressure transition are addressed.

All of the above specifically mentioned or identified U.S. patents and the C. A. Stuart published article are hereby fully and specifically incorporated herein for forming part of applicant's written description as if their content had been set forth in full.

IDENTIFICATION OF THE OBJECTS OF THE INVENTION

An object of the present invention is to provide a method for disposing hazardous waste in a borehole extending into a subsurface geopressured formation or cell.

It is another object of this invention to provide a method that will provide for permanent safe disposal of radioactive and/or other hazardous waste in boreholes formed in geopressure formations.

Another object of this invention is to provide a disposal method where sealed containers filled with hazardous waste are encased within a subsurface geopressured formation to prevent waste migration in the event of container failure.

A further object of the present invention is to provide a method of disposal of hazardous waste by hydraulically injecting hazardous waste into the pores of a geopressured formation or cell to trap the waste within the geopressured formation.

SUMMARY OF THE INVENTION

The present invention relates to a method for permanently disposing hazardous waste in a borehole extending through a sealed, non-migrating geopressured formation. In one embodiment the waste is sealed in an elongated container which is lowered down the borehole to concentrically position the containers in a stacked relationship in the borehole within a geopressured formation. The stacked containers are then completely encased within the borehole for restoring the geopressure formation seal.

A second embodiment of the method for disposing hazardous waste in a borehole extending through a non-migrating geopressured formation includes pumping the dissolved or entrained hazardous waste down the borehole and injecting the waste through perforations in the casing into the pores of the geopressured formation. The pressurized hazardous waste may fracture the geopressured formation and upon reduction in the pressure the waste is trapped in the geopressured formation which is then resealed to restore its geopressure characteristics.

BRIEF DESCRIPTION OF THE DRAWINGS

The objects, advantages, and features of the invention will become more apparent by reference to the drawings which are appended hereto and where like numerals indicate like parts, and wherein an illustrated embodiment of the invention is shown, of which.

DESCRIPTION OF THE PREFERRED EMBODIMENT

Figure 1:
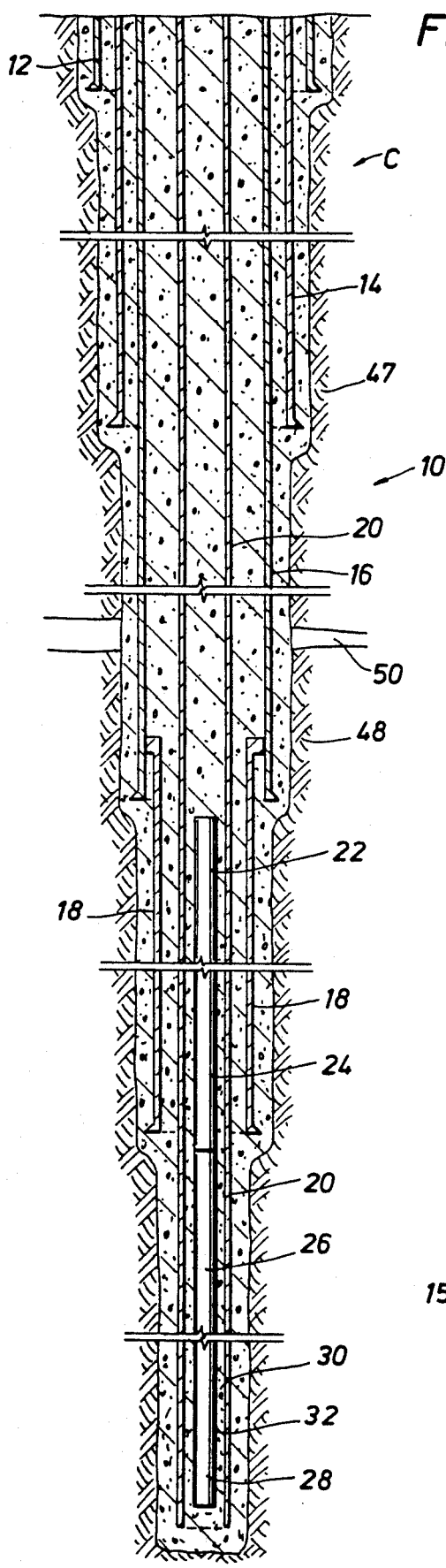
FIG. 1 is an elevational view in section of a permanent storage borehole of the present invention extending into a sealed geopressured subsurface formation or cell.

A permanent storage or disposal well or borehole, generally designated 10, employed in the present invention, is illustrated in FIG. 1, that extends from the earth surface S into the earth's crust C. The borehole 10 may be formed by any suitable known method of drilling the crust C. The borehole 10 typically includes, in sequence from outside to inside, a tubular conductor casing 12, a surface casing 14, a protective casing 16, a protective liner 18 (supported from casing 16), and an inner casing 20. As is known, the various well tubular conduits are arranged concentrically and extend to various subsurface depths with the smaller conduits extending to the greater depths in the crust C. While the illustrated casing arrangement may be suitable for some locations, those skilled in the art will appreciate the casing program actually used will depend on numerous factors and may be varied from that disclosed without departing from the present invention. Part or all of the casing may be rendered permanent by cementing in place as illustrated. However, it will be understood that the fully cemented condition illustrated in FIG. 1 is not achieved until the hazardous waste has been properly placed or positioned using the bore hole 10.

Disposed within the inner casing 20 are a plurality of substantially identical elongated closed containers, referenced from top to bottom 22, 24, 26, and 28 for receiving the hazardous material. Containers 24 and 26 are illustrated stacked vertically in tandem, but FIG. 1 is broken between containers 22 and 24 and containers 26 and 28 so as to schematically illustrate any desired number or plurality of containers 22, 24, 26, and 28 to be disposed or located in the casing 20. Those skilled in the art will also appreciate any suitable equivalent safe container for the hazardous waste to be disposed of in the borehole may be used. The material and configuration of the containers is a matter of design choice as long as they may be safely placed in the borehole 10 at the desired location by passing within the tubular casing.

It is preferred that the containers be disposed concentric with the longitudinal axis of the inner casing 20 to aid in proper surrounding concentric encasement and storage of the containers 22, 24, 26 and 28 by concrete. Referring to lowermost container 28, a substantially concentric annulus is formed between the inwardly facing surface 30 of the inner casing 20 and the outwardly facing surface 32 of the container 28 which is filled with cement which then hardens in place. Various types of centralizers (not illustrated) may be used to hold the containers 22-28 in the concentric position during cementing.

Figure 2:
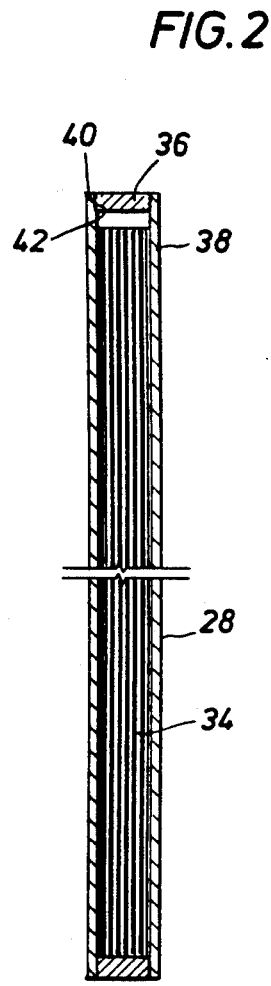
FIG. 2 is an elevational view in section, of an elongated container apparatus for receiving the waste that is permanently stored in a borehole formed in the geopressure zone.

Turning now to FIG. 2, the elongated container 28, which is typical of the plurality of containers 22, 24, and 26, forms a waste material storage cavity or interior 34 and includes a sealing or closure cap 36. In the preferred embodiment the container 28 is vitrified to ensure that the container 28 will not rapidly decay with the passage of time.

The seal cap 36 is threadedly secured at the upper end 38 of the container 28 and provides a fluid seal for preventing leakage of hazardous waste from the interior 34 of the container 28. In the preferred embodiment the seal cap 36 has outwardly facing helical pin threads 40 and the container 28 has complementary inwardly facing helical box threads 42 for securing the sealing the cap 36 with the container 28. The container 28 is preferably sealed with the seal cap 36 a the waste processing or generation site for safe transportation to the disposal well 10.

The hazardous waste is sealed within the container 28 which is preferably formed in lengths of 30 ft to 60 ft and outside diameters of 5 to 6 inches. Such outside diameter allows the container 28 to be lowered into the borehole 10 through inner casing 20 which is somewhat larger in inside diameter to provide a desired radial clearance. The storage containers 28 are lowered in the borehole 10 until they are positioned or stacked for permanent safe disposal within a geopressured zone 48 which will be described in greater detail hereinafter.

Figure 3:
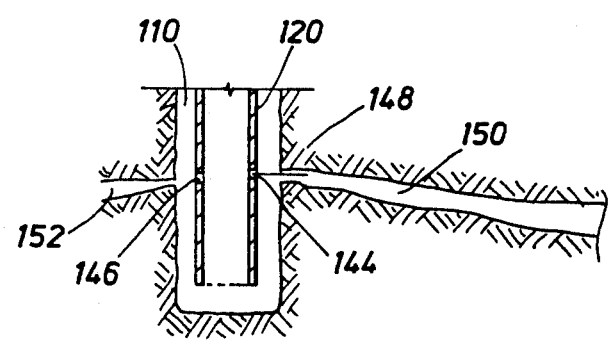
FIG. 3 is a fragmentary elevational view, in section, of a second embodiment of a borehole of the present invention in which the hazardous waste is placed within the geopressure formation.

In FIG. 3 a fragmentary elevational view of the second embodiment of the hazardous waste disposal borehole of the present invention is illustrated which injects the hazardous material directly into the pores of the geopressured formation or zone. The hazardous waste may be entrained or in solution in the carrier hydraulic fluid. In the second embodiment, like reference characters, but increased by a factor of 100, will be used to designate like parts. The inner casing 120 is positioned in the borehole 110 similar to the bottom of inner casing 20 positioned in borehole 10 in FIG. 1, but the casing 120 is not cement filled to provide a flow passageway from the earth's surface. The inner casing 120 has a plurality of perforations 144 and 146 extending therethrough which communicate with the surrounding geopressured formation 148. The geopressured formation 148 is hydraulically split or fractured 150 by pressurized hazardous waste liquid directly injected through perforations 144 and 146 into the pores the geopressured formation 148.

USE AND OPERATION

In the use and operation of the preferred embodiment, a borehole 10 extending through a hydropressure zone 47 into geopressured formation 48 is formed or drilled and suitably cased. The present invention encompasses use of existing boreholes 10 drilled for oil, gas, or geothermal exploitation, which have been drilled through hydropressure zones 47 into geopressured formations 48. If needed, new boreholes or existing boreholes could be drilled deeper to provide the desired storage cavity in a geopressured zone 48. The hydropressure and geopressure formations 47 and 48 are separated by the mutation or transition zone 50 that forms the upper seal for the geopressure cell, formation or zone 48. The geopressure seal formed by the transition zone 50 is penetrated when forming the borehole 10, but care should be taken not to disturb any other seal of the geopressure formation or cell. The casing adjacent the transition zone 50 may be permanent or temporary (recoverable), but should not interfere with rescaling of the geopressure formation 48.

While geopressured formations or zones are well known and easily recognized to those skilled in the art as abnormally high pressure zones, a brief explanation or review of such special formations may be useful to appreciating the present invention. Geopressured formations are characterized by abnormally high interstitial or pore fluid pressures existing in subsurface formations. Geopressure formations or zones come into being due to geostatic compaction by overlaying sediments which action eventually produces a pressure seal transition zone that prevents fluids from leaving the geopressure cell or formation, thereby resulting in abnormally high interstitial or pore fluid pressure from the geostatic pressure. The geopressure seals are extremely old and unlikely to be disturbed by natural geological changes such as earthquakes.

Abnormally high interstitial pressure is defined in relation to normal or hydrostatic pressures for the location or depth of the subsurface formation. Normal pressures are those exerted by a column of naturally occurring water between the surface of the earth and the depth at which the pressure is being measured (the hydrostatic head). A hydropressure formation system with normal pressure is termed an open system that enables migration of the liquid to normalize pressure. Naturally occurring waters vary in density equivalent ranging from 0.433 psi/ft to 0.465 psi/ft. Thus a normal hydrostatic pressure, in a hydropressure formation will vary with depth (the hydrostatic head). Hazardous waste, if composed of heavy dense metal molecules, as with nuclear waste, tend to segregate to levels lower than the natural interstitial water. In a sealed geopressure cell or zone, the lower geopressure seal will contain that internal migration since the lower or bottom seal is not disturbed in forming the borehole 10. At any rate, assuming a geopressure zone seal 50 is penetrated or breached at 7,000 ft, and further assuming escaped water does actually migrate towards the surface of the earth, the driving gradient would be quickly dissipated, and very little real movement of the hazardous waste would occur. Furthermore, since the radiation level of the nuclear waste declines to harmless levels within 400 years (McGraw Hill Encyclopedia of Engineering, 1982, Parker, Cybil, Editor, page 885) danger of contamination from escaping radiation is virtually nonexistent. Additionally if the hazardous waste is contained within a steel and concrete cased borehole below the reestablished upper geopressure seal, as disclosed in the present invention, there would be a further assurance against leakage.

At the well or borehole 10, the waste filled elongated containers 22, 24, 26, 28 are moved down lowered individually into the borehole 10 by wireline until positioned within the geopressured formation 48. The containers are stacked or placed in a tandem relationship concentric with the casing 20 as shown in FIG. 1. In most deep boreholes, approximately 14,000 to 25,000 ft. in depth, 5,000 ft to 10,000 ft of elongated containers 22, 24, 26, and 28 may be lowered into the borehole 10 and still remain within the geopressured formation.

The containers 22, 24, 26 and 28 are then encased within the borehole 10 by cementing the interior of casing 20 back to the surface S of the earth. The metal casing adjacent the geopressure zone seal 50 is preferably removed prior to encasement to avoid forming a leak path when the metal corrodes. This encasement would be performed to insure permanent safety in the permanent disposal of the hazardous waste. This encasement also restores the seal 50 of the geopressure zone 48 to prevent migration up the borehole 10. The preferred embodiment uses a cement mixture to encase the containers 22, 24, 26 and 28 but other types of encasing mixtures or compositions could be used. The resultant relatively small column of containers 22, 24, 26 and 28 enables heat and radiation to dissipate into the relative large volume of sediments and trapped non-migrating salt water to provide a final or safe permanent disposal of the hazardous waste.

The second embodiment for a method for disposal of hazardous waste as illustrated in FIG. 3 is especially well suited for low permeability geopressure zones. A well casing 120 in the borehole 110 is perforated at 144 and 146. By pressurizing the hydraulic waste including entrained or suspended solids to move down the bore of casing 120 from the surfaces through the perforations 144 and 146 the hazardous waste is forced to flow into and thereby fracture the geopressured formation 148. When the injection pressure on the hazardous waste is reduced, the fractures close and the solid and liquid waste material is trapped in the geopressured formation 48. The waste fluid bleed into local sections increasing the pressure within the geopressure zone slightly and the entrained solids are trapped and held permanently within the formation. Thus the hydraulic fracture technique can be used for emplacement of both liquid waste and sand grain sized solid waste.

Hydraulic fracture technology has been used in the oil industry for enhancement of recovery of hydrocarbons. Such procedures create formation fractures through very intense hydraulic pressure applied by pumps at the surface S of the earth's crust C and transmitted to the geopressure formation 50 through the casing 120 in the borehole 110. The resulting hydraulic formation fractures are of small width, usually 2 inches or less, which grow in vertical height, 100 ft to 1000 ft, and radial penetration of 200 ft to 2000 ft from the point of fracture initiation at the perforations 44 and 46, but can hold relatively large volumes of fluids and entrained solids.

After injection of the hazardous material into the geopressure zone 148 the borehole is sealed with concrete to reestablish the geopressure zone seal 50 and prevent migration up the borehole 10.

It will be appreciated that to maximize the disposal in a particular geopressure cell or formation, that both disclosed embodiments may be employed sequentially to dispose of the hazardous waste. By sequentially it should be understood that the containers may be placed in the borehole before or after disposal by pumping.

This is preferably accomplished by filling the entire borehole with cement (FIG. 1), but suitable monitoring passages may be provided above the transition zone. If desired a radioactive barrier of any suitable material such as lead may be used to help reestablish the seal.

Various modifications and alterations in the described apparatus and methods will be apparent to those skilled in the art of the foregoing description which does not depart from the spirit of the invention. For this reason, these changes are desired to be included in the appended claims. Dependent claims recite the only limitation to the present invention and the descriptive manner which is employed for setting forth the embodiments and is to be interpreted as illustrative and not limitative.

What is claimed is:

1. A method of safely disposing of hazardous waste, including the steps of: forming a borehole in the earth's crust extending from the surface to the interior of a geopressure cell by penetrating the geopressure barrier seal; placing the hazardous waste material in the geopressure cell by moving the hazardous waste through the borehole; and reestablishing the geopressure seal of the geopressure cell to prevent migration of the hazardous waste from the geopressure seal.

2. The method as set forth in claim 1, wherein the step of placing further includes: lowering sealed containers filled with hazardous material down the borehole.

3. The method as set forth in claim 2, wherein the steps of placing further includes: stacking the lowered sealed containers in the borehole.

4. The method as set forth in claim 3, wherein the step of placing further includes: centering the stacked sealed container in the borehole to enable surrounding encasement of the containers within the geopressure cell.

5. The method as set forth in claim 1, wherein the step of placing further includes: pumping the hazardous material down the borehole and into the geopressure cell.

6. The method as set forth in claim 1, wherein the step of forming a borehole further includes:
penetrating a transition zone seal forming the geopressure cell.

7. The method as set forth in claim 1, wherein the steps of forming a borehole further includes:
penetrating a seal forming the geopressure cell.

8. The method as set forth in claim 1, wherein the step of reestablishing the seal of the geopressure cell, includes:
substantially filling the borehole from the geopressure cell to the surface with cement.

9. The method as set forth in claim 1, wherein the step of reestablishing the seal of the geopressure cell, includes:
substantially filling the borehole with a suitable material.

* * * * *